(12) United States Patent
Byun et al.

(10) Patent No.: US 9,694,726 B2
(45) Date of Patent: Jul. 4, 2017

(54) APPARATUS AND METHOD FOR CONTROLLING AIR CELLS OF SEAT

(71) Applicant: HYUNDAI DYMOS INCORPORATED, Seosan-si, Chungcheongnam-do (KR)

(72) Inventors: Deuk Kyu Byun, Gunpo-si (KR); Chang Won Lee, Osan-si (KR)

(73) Assignee: HYUNDAI DYMOS INCORPORATED, Seosan-si (KR)

( * ) Notice: Subject to any disclaimer, the term of this patent is extended or adjusted under 35 U.S.C. 154(b) by 161 days.

(21) Appl. No.: 14/825,277

(22) Filed: Aug. 13, 2015

(65) Prior Publication Data

US 2016/0046216 A1 Feb. 18, 2016

(30) Foreign Application Priority Data

Aug. 13, 2014 (KR) .......................... 10-2014-0105464

(51) Int. Cl.
 *B60N 2/44* (2006.01)
 *B60N 2/00* (2006.01)
(52) U.S. Cl.
 CPC ........... *B60N 2/4415* (2013.01); *B60N 2/002* (2013.01); *B60N 2/4492* (2015.04)
(58) Field of Classification Search
 None
 See application file for complete search history.

(56) References Cited

U.S. PATENT DOCUMENTS

| | | | | |
|---|---|---|---|---|
| 4,655,505 A | * | 4/1987 | Kashiwamura | A47C 7/467 297/284.6 |
| 5,044,029 A | * | 9/1991 | Vrzalik | A61G 7/001 5/713 |
| 6,088,642 A | * | 7/2000 | Finkelstein | B60N 2/002 297/284.1 |
| 6,098,000 A | * | 8/2000 | Long | A47C 4/54 297/284.6 |
| 6,427,538 B1 | * | 8/2002 | Potter | A47C 7/467 701/49 |
| 2010/0191390 A1 | * | 7/2010 | Champion | B60N 2/002 701/1 |

FOREIGN PATENT DOCUMENTS

KR 10-2005-0089230 9/2005

* cited by examiner

*Primary Examiner* — David E Allred
(74) *Attorney, Agent, or Firm* — Brinks Gilson & Lione

(57) ABSTRACT

The present disclosure provides a method and an apparatus for controlling air cells of a seat. The apparatus includes: air cells provided on opposing sides of the seat to support a portion of the body of the passenger seated on the seat; pressure sensors to measure internal pressures of the air cells; and a control unit to receive the measured pressures of the air cells. Then, the control unit compares and stores the pressures of the air cells when a startup of the vehicle is off. When the startup is on, the control unit controls expansion of the air cells according to any one of the pressures of the air cells which are compared and stored in the control unit when the startup is off.

3 Claims, 4 Drawing Sheets

FIG. 1 "Prior Art"

APPARATUS AND METHOD FOR CONTROLLING AIR CELLS OF SEAT

CROSS-REFERENCE TO RELATED APPLICATION

The present application claims the benefit of Korean Patent Application No. 10-2014-0105464, filed Aug. 13, 2014, which is hereby incorporated by reference in its entirety.

FIELD

The present disclosure relates to a technology of controlling air cells of a seat, and more particularly, to an apparatus and a method for controlling air cells of a seat.

BACKGROUND

The statements in this section merely provide background information related to the present disclosure and may not constitute prior art.

Air cells (air bags) for stably supporting the body of a passenger seated on a seat may be provided on opposite sides of a seatback of a vehicle, and air is injected into or discharged from the air cells by a pneumatic system including a motor, an air pump, an operation switch, and the like.

FIG. 1 is a view illustrating a method of controlling air cells pneumatic system according to the related art, and the air cells 1 are expanded and restored by pressures of the air injected into the air cells through an operation of a motor, a pressure of the air, and a switch operation time when the startup of the vehicle is off and then when the startup of the vehicle is on, supplying the air into the air cells 1 by an amount of the air stored when the previous startup is off.

However, as illustrated in the accompanying drawing, if the pressures of the air cells are stored while the posture of the passenger seated on a seat is distorted, the pressures of the opposite air cells are stored while the pressures and volumes of the air cells are different, and accordingly, when the air cells are restored as the startup of the vehicle is on, the air cell to which a load of the passenger is applied is expanded and restored to a relatively small volume as compared with the opposite air cell, so that the passenger should manipulate an operation switch to adjust the volumes of the air cells.

SUMMARY

The present disclosure provides an apparatus and a method for controlling air cells of a seat, by which even though air cells situated on opposing sides of the seat are asymmetrically stored, the air cells are expanded and restored at the same pressure when the air cells are expanded and restored, and convenience of use thereof can be improved and a proper driving posture can be maintained.

In one aspect, the present disclosure provides an apparatus for controlling air cells of a seat, the apparatus including: air cells situated on opposing sides of the seat, for supporting a portion of the body of the passenger seated on the seat; pressure sensors for measuring internal pressures of the air cells; and a control unit to which the measured pressures of the air cells are input, for comparing and storing the pressures of the air cells when a startup of the vehicle is off, and, when the startup is on, making a control to expand the air cells by the same degree with any one of the pressures of the air cells compared and stored at the time when the startup is off.

When the startup is on, the control unit makes a control to expand the air cells depending on the lower one of the pressures of the air cells stored when the startup is off.

The control unit makes a control to store only the pressure of the air cell having the lower pressure when the startup is off.

The control unit makes a control to exhaust the air filled in the air cells when the startup is off.

In another aspect, the present disclosure provides a method of controlling air cells situated on opposing sides of a seat, the method including: a measuring step of measuring internal pressures of the air cells by at least one pressure sensor; and a controlling step, by the control unit, of inputting the measured pressures of the air cells, comparing and storing the pressures of the air cells when the startup is off, and making a control to expand the air cells by the same degree with any one of the compared and stored pressures of the air cells when the startup is off, when the startup is on.

The method further includes: a determining step of determining manipulation of an operation switch for expanding and contracting the air cells.

Pressure of the interiors of the air cells are measured by pressure sensors, the pressures measured by the pressure sensors are input to a control unit, air is injected into and exhausted from the air cells by a pneumatic system, and the control unit controls the pressures of the air cells by operating the pneumatic system.

According to the present disclosure, even though the air cells are asymmetrically stored due to a distorted posture of the passenger, the opposite air cells are expanded and restored at the same pressure depending on the lowest pressure when the air cells are expanded and restored, and accordingly, because a separate manipulation of the passenger for symmetry of the air cells is not necessary, convenience of use thereof can be improved and a proper driving posture can be maintained.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
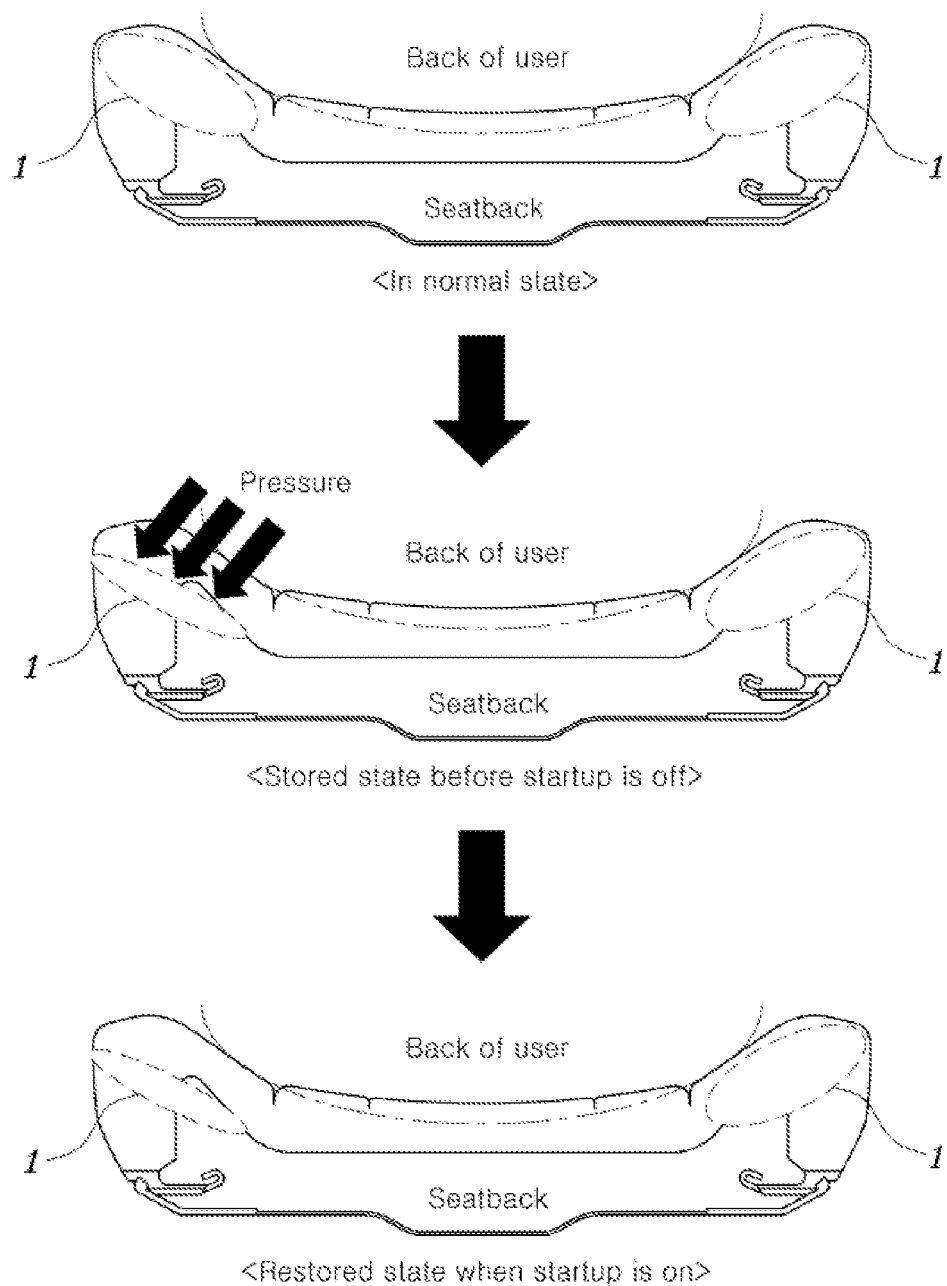
FIG. 1 is a view illustrating a state in which air cells situated on one side of a seat are asymmetrically expanded and restored when the air cells are restored according to the related art.

It should be understood that the appended drawings are not necessarily to scale, presenting a somewhat simplified representation of various preferred features of the present disclosure as disclosed herein, including, for example, specific dimensions, orientations, locations, and shapes will be determined in part by the particular intended application and use environment.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The air cell control apparatus for a seat according to the present disclosure largely includes air cells 10, pressure sensors 11, and a control unit 13.

Figure 2:
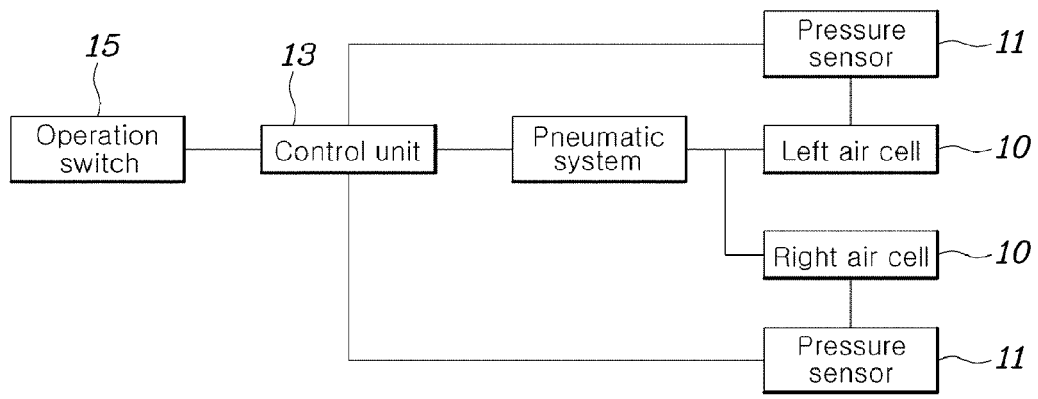
FIG. 2 is a view schematically illustrating an entire configuration of an air cell control apparatus according to the present disclosure.
Figure 3:
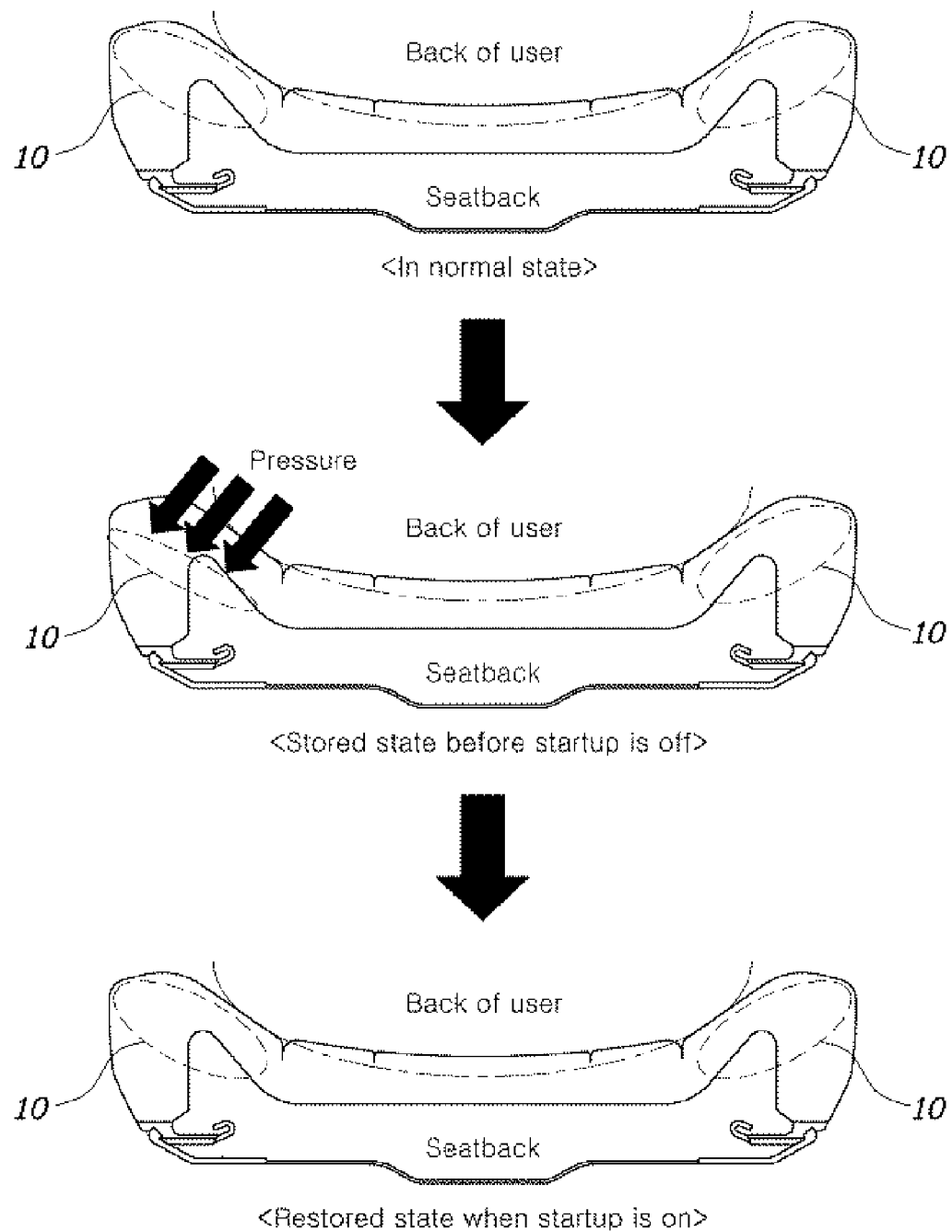
FIG. 3 is a view illustrating a configuration of the air cell control apparatus and a state in which air cells situated on one side of a seat are symmetrically expanded and restored when the air cells are restored according to the present disclosure.

Referring to FIGS. 2 and 3, the air cell control apparatus according to the present disclosure includes: air cells 10 provided on opposing sides of the seat, for supporting a portion of the body of the passenger seated on the seat; pressure sensors 11 for measuring internal pressures of the air cells 10; and a control unit 13 to which the measured pressures of the air cells 10 are input, for comparing and storing the pressures of the air cells 10 when a startup of the vehicle is off and making a control to expand the air cells 10 by the same degree with any one of the pressures of the air cells 10 compared and stored when the startup is on.

Here, the air cells 10 may be installed on opposing sides of the seatback, and air may be injected into and exhausted from the air cells 10 by a pneumatic system including air pumps, motors, and valves.

That is, the air pumps may be connected to the air cells 10 such that air may be injected into the air cells 10, and the air pumps may be operated by the motors. The valves may be installed between the air pumps and the air cells 10, and may exhaust the air in the interior of the air cells 10.

The pressure sensors 11 are provided in the air cells 10 to independently measure the pressures of the air cells 10, and may be provided in the air cells 10 or on paths along which air is injected from the air pumps and the air cells 10.

That is, according to the present disclosure, even though the air cells 10 are asymmetrically stored due to a distorted posture of the passenger, the air cells 10 are expanded and restored at the same pressure when the air cells 10 are expanded and restored, and thus a separate manipulation by the passenger to symmetrically expand the air cells 10 is not necessary. And thus convenience of use thereof is improved and a proper driving posture can be maintained.

In particular, when the startup is on, the control unit 13 may make a control to expand the air cells 10 depending on the lowest one of the pressures of the air cells 10 stored when the startup is off.

In one form, the control unit 13 may store only the pressure of the air cell 10 having a relatively low pressure when the startup is off.

That is, the control unit 13 compares and memorizes the pressures of the left and right air cells 10 when the startup of the vehicle is off, and compares the left and right pressures when the air cells 10 are restored to expand and restore the air cells 10 with reference to the air cell 10 that is comparatively more expanded.

In other words, if a local pressure is applied to one of the air cells 10 due to the distorted posture of the passenger, a pressure higher than that of the other air cell 10 will be stored. Accordingly, because the control unit 13 compares the left and right pressures to restore the pressure to the lower pressure, that is, the air pressure of the one side, to which a local pressure is not applied, the air cells 10 are expanded at the same air pressure when the passenger is seated even though the pressures of the left and right air cells 10 are differently stored when the startup is off and thus the user may drive the vehicle while being seated comfortably.

The control unit 13 may exhaust the air filled in the air cells 10 when the startup is off.

That is, when the startup of the vehicle is off, the air filled in the air cells 10 is exhausted, and then when the startup of the vehicle is turned on again, the air cells 10 are expanded and restored using the pressure stored in the control unit 13 at the time when the startup is off.

A method for controlling air cells 10 according to the present disclosure may include a measuring step and a controlling step.

Figure 4:
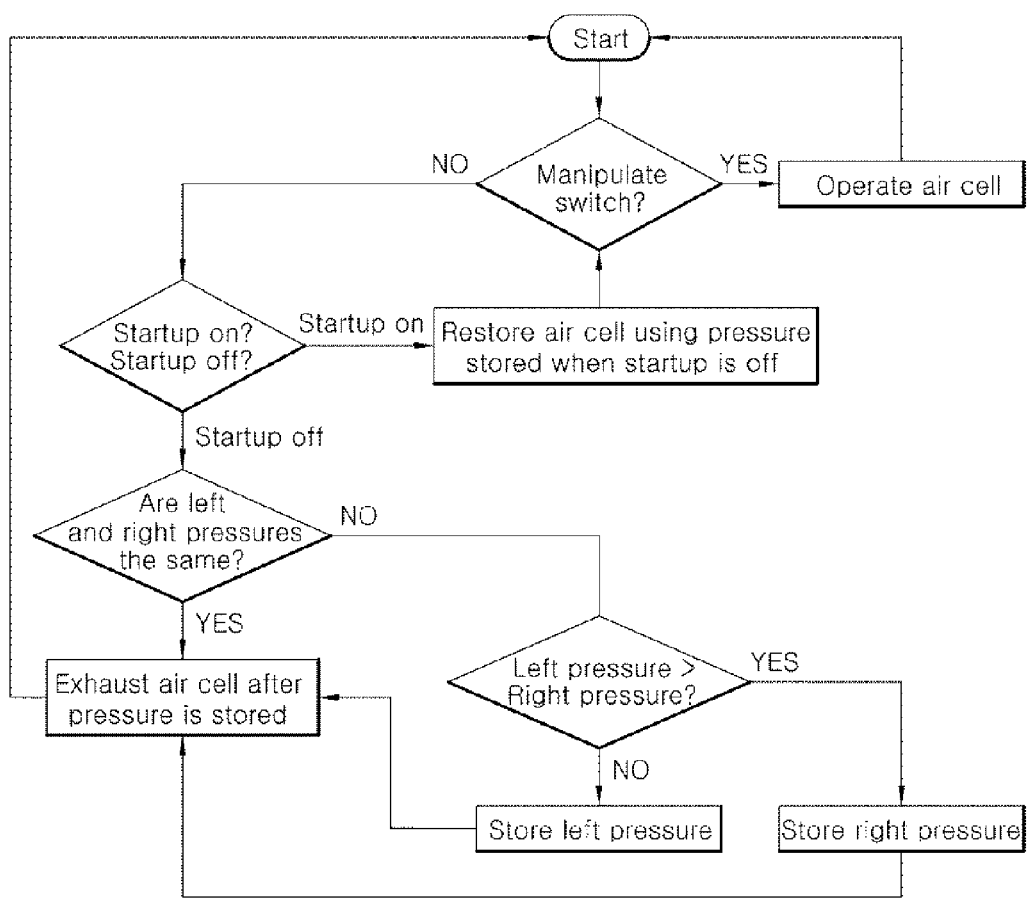
FIG. 4 is a flowchart illustrating a control flow of an air cell control method according to the present disclosure.

Referring to FIG. 4, the method for controlling the air cells 10 provided on opposing sides of a seat may include: a measuring step of measuring internal pressures of the air cells 10 by pressure sensors 11; and a controlling step, by the control unit 13, of receiving the measured pressures of the air cells 10, comparing and storing the measured pressures of the air cells 10 when the startup is off, and also when the startup is on, making a control to expand the air cells 10 by the same degree with any one of the compared and stored pressures of the air cells 10.

The method may further include a determining step of determining manipulation of an operation switch 15 to expand or contract the air cells 10.

That is, after the start on and off conditions are identified, the pressures of the left and right air cells 10 are compared and stored if the startup is off, and then the air in the air cells 10 is exhausted.

Then, when the pressures of the air cells 10 are different, only the lower one of the pressures of the air cells 10 may be stored.

Next, the air cells 10 on one side (e.g., one of the opposing sides) are expanded and restored with reference to the pressure stored as the lower pressure when the startup of the vehicle is on.

If the passenger manipulates the operation switch 15 while the startup of the vehicle is on, the air cells 10 may can be expanded or contracted while the air in the interior of the air cells 10 is injected or exhausted according to the manipulation of the operation switch 15.

Meanwhile, although the detained example of the present disclosure has been described in detail, it will be clearly understood that various modifications and changes may be made without departing from the spirit of the present disclosure and fall within the scope of the claims.

What is claimed is:

1. An apparatus for controlling air cells of a seat, the apparatus comprising:
    a plurality of air cells situated on opposing sides of the seat and configured to support a passenger seated on the seat;
    at least one pressure sensor configured to measure internal pressures of the air cells; and
    a control unit configured to receive the measured pressures of the air cells and to compare and store at least one measured pressure of the air cells when a startup of the vehicle is off, and
    wherein when the startup is on, the control unit is configured to control an expansion of the air cells by a same degree as any one of the measured pressures of the air cells which are previously compared and/or stored in the control unit when the startup is off, wherein when the startup is on, the control unit is configured to control the expansion of the air cells depending on a low pressure among the measured pressures of the air cells, and wherein the control unit is configured to store only the lowest pressure of the air cells among the measured pressures.

2. The apparatus according to claim 1, wherein the control unit is configured to control an exhaustion of an air filled in the air cells when the startup is off.

3. The apparatus according to claim 1, wherein the control unit is configured to compare the measured pressures of the air cells situated on one of the opposing sides with the measured pressures of the air cells on other side and to store the lowest pressure based on the comparison.

* * * * *